(12) United States Patent
Youngquist et al.

(10) Patent No.: US 9,151,639 B2
(45) Date of Patent: Oct. 6, 2015

(54) TWO-DIMENSIONAL INDUCTIVE POSITION SENSING SYSTEM

(71) Applicant: The United States of America as Represented by the Administrator of the National Aeronautics and Space Administration, Washington, DC (US)

(72) Inventors: Robert C. Youngquist, Cocoa, FL (US); Stanley O. Starr, Satellite Beach, FL (US)

(73) Assignee: The United States of America as Represented by the Administrator of the National Aeronautics and Space Adminstration, Washington, DC (US)

( * ) Notice: Subject to any disclaimer, the term of this patent is extended or adjusted under 35 U.S.C. 154(b) by 55 days.

(21) Appl. No.: 14/176,824

(22) Filed: Feb. 10, 2014

(65) Prior Publication Data

US 2014/0266166 A1  Sep. 18, 2014

Related U.S. Application Data

(60) Provisional application No. 61/781,222, filed on Mar. 14, 2013.

(51) Int. Cl.
*G01B 7/14* (2006.01)
*G01D 5/20* (2006.01)
*G01B 7/00* (2006.01)

(52) U.S. Cl.
CPC .............. *G01D 5/2073* (2013.01); *G01B 7/003* (2013.01)

(58) Field of Classification Search
CPC ..... G01D 5/2291; G01D 5/2073; G01B 7/003
USPC ....................................... 324/207.15, 207.16
See application file for complete search history.

(56) References Cited

U.S. PATENT DOCUMENTS

| | | | | |
|---|---|---|---|---|
| 5,558,091 | A | * | 9/1996 | Acker et al. .................. 600/424 |
| 7,782,046 | B2 | * | 8/2010 | Anderson ................. 324/207.17 |
| 8,947,074 | B1 | * | 2/2015 | Youngquist et al. ..... 324/207.16 |
| 2011/0133727 | A1 | | 6/2011 | Youngquist et al. |

* cited by examiner

*Primary Examiner* — Reena Aurora
(74) *Attorney, Agent, or Firm* — Michelle L. Ford; Peter J. Van Bergen

(57) ABSTRACT

A two-dimensional inductive position sensing system uses four drive inductors arranged at the vertices of a parallelogram and a sensing inductor positioned within the parallelogram. The sensing inductor is movable within the parallelogram and relative to the drive inductors. A first oscillating current at a first frequency is supplied to a first pair of the drive inductors located at ends of a first diagonal of the parallelogram. A second oscillating current at a second frequency is supplied to a second pair of the drive inductors located at ends of a second diagonal of the parallelogram. As a result, the sensing inductor generates a first output voltage at the first frequency and a second output voltage at the second frequency. A processor determines a position of the sensing inductor relative to the drive inductors using the first output voltage and the second output voltage.

21 Claims, 2 Drawing Sheets

TWO-DIMENSIONAL INDUCTIVE POSITION SENSING SYSTEM

CROSS-REFERENCE TO RELATED APPLICATIONS

This application claims the benefit under 35 U.S.C. §119 (e) of U.S. Provisional Application Ser. No. 61/781,222, filed on Mar. 14, 2013, the contents of which are incorporated herein by reference.

ORIGIN OF INVENTION

The invention described herein was made by employees of the United States Government and may be manufactured and used by or for the Government for governmental purposes without the payment of any royalties thereon or therefore.

BACKGROUND OF THE INVENTION

1. Field of the Invention

The present invention is directed to position sensors, and more particularly to a two-dimensional inductive position sensing system using an arrangement of parallel inductors.

2. Description of Related Art

A variety of position sensors are known in the art. Examples include capacitance-based position sensors, laser-based position sensors, eddy-current sensing position sensors, and linear displacement transducer-based position sensors. While each type of position sensor has its advantages, each also presents disadvantages for some applications. For example, the size of capacitors can make their use impractical when the position sensor must be small in size. The same is true for linear displacement transducers. The complexity and/or cost of laser-based sensors and eddy-current-based sensors can negate their advantages in a number of applications.

More recently, U.S. Patent Publication No. 2011/0133727 disclosed an inductive position sensor using three inexpensive inductors arranged along a line. Briefly, the two inductors on either end of the linear arrangement are driven in series at the same frequency, but such that they generate opposing magnetic fields. The total magnetic field between them cancels at a central location, yet varies in a surprisingly linear fashion about the central location. The third inductor is used as a sensor to sample this magnetic field. The third (sensing) inductor is positioned between the two drive inductors and generates a voltage that is linearly dependent on the third inductor's position between the two drive inductors over reasonable translation ranges. However, the three aligned inductors define a one-dimensional inductive position sensor that is not sensitive to movement of the third (sensing) inductor off of the line that defines the linear arrangement of the three inductors. That is, if the third (sensing) inductor moves off the line that connects the outer two drive inductors, the voltage change caused by such movement is minimal thereby making it difficult to monitor an off-line motion or position.

BRIEF SUMMARY OF THE INVENTION

The present invention is directed to a two-dimensional inductive position sensing system that uses five inductors. Four of the inductors are drive inductors that are arranged at the vertices of a parallelogram such that the axial core associated with each drive inductor is located at one of the parallelogram's vertices. A sensing inductor is positioned within the parallelogram such that its axial core is parallel to each axial core of the drive inductors. Each of the drive inductors and sensing inductor is a mechanically independent inductor structure. The drive inductors and sensing inductor are immersed in a common medium, such as air, so that the drive inductors and sensing inductor are inductively coupled through the common medium. The sensing inductor is movable within the parallelogram and relative to the drive inductors such that the axial core of the sensing inductor remains parallel to each axial core of the drive inductors. A first oscillating current at a first frequency is supplied to a first pair of the drive inductors located at ends of a first diagonal of the parallelogram. A second oscillating current at a second frequency is supplied to a second pair of the drive inductors located at ends of a second diagonal of the parallelogram. As a result, the sensing inductor generates a first output voltage at the first frequency and a second output voltage at the second frequency. A processor coupled to the sensing inductor determines a position of the sensing inductor relative to the drive inductors using the first output voltage and the second output voltage.

BRIEF DESCRIPTION OF THE DRAWINGS

The features and advantages of the present invention will become apparent from the following detailed description of an embodiment thereof, taken in conjunction with the accompanying drawing, in which.

DETAILED DESCRIPTION OF THE INVENTION

Figure 1:
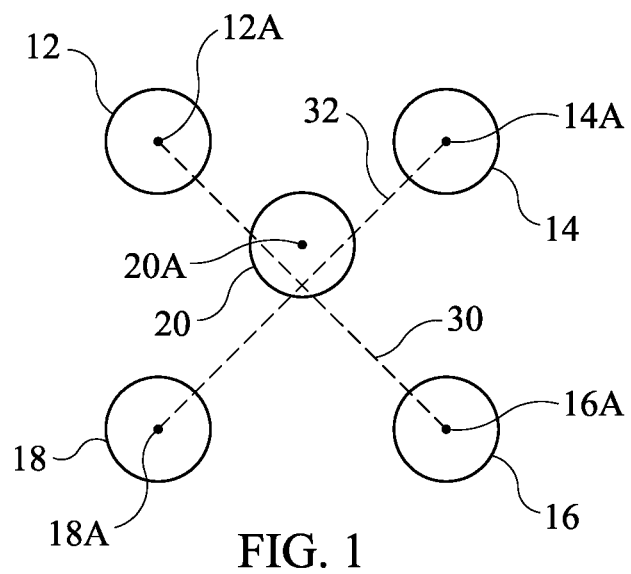
FIG. 1 is a plan view of an inductor arrangement used in a two-dimensional inductive position sensing system in accordance with an embodiment of the present invention.
Figure 2:
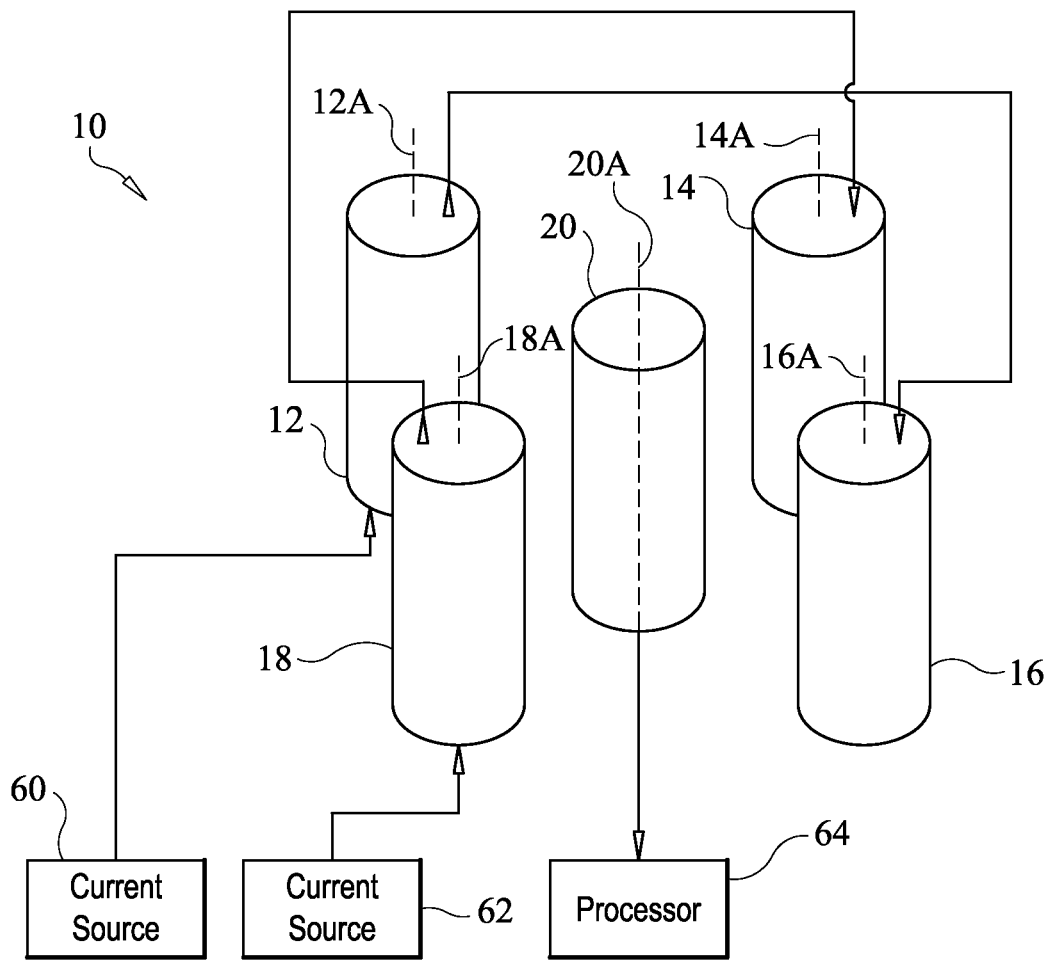
FIG. 2 is a schematic view of the two-dimensional inductive position sensing system with its current source and processor coupled to the inductors in accordance with an embodiment of the present invention.
Figure 3:
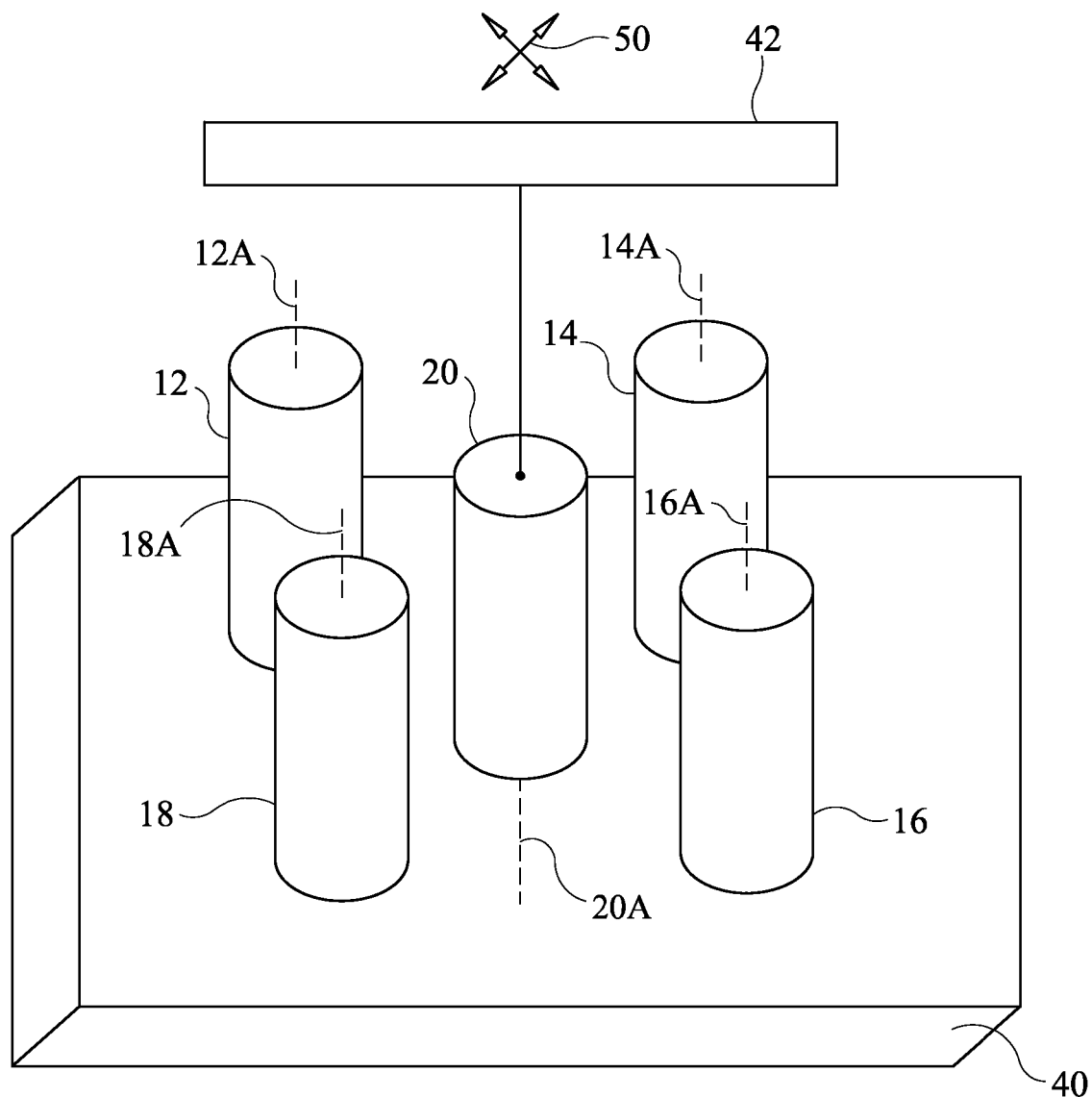
FIG. 3 is a schematic view of mechanical aspects of the two-dimensional inductive position sensing system in accordance with an embodiment of the present invention.

Referring now to the drawings, simultaneous reference will be made to FIGS. 1-3 where various aspects of a two-dimensional inductive position sensing system are illustrated. Briefly, the sensing system of the present invention uses five inductors. FIG. 1 illustrates one possible geometric arrangement between the inductors. FIG. 2 illustrates the various electrical system elements coupled to the inductors. FIG. 3 illustrates mechanical aspects of the sensing system.

The inductive position sensing system 10 of FIG. 2 includes five spaced-apart inductors. Four of the inductors are drive inductors referenced by numerals 12, 14, 16, and 18. The fifth inductor is a sensing inductor referenced by numeral 20. For purposes of the present invention, each of inductors 12, 14, 16, 18, and 20 is essentially a coil of wire wrapped about its own separate and mechanically independent ferromagnetic core in accordance with constructions well known and understood in the art. That is, the inductors used in the present invention are not torroidal inductors. The coil and ferromagnetic core are omitted from the figures for clarity of illustration. However, as is also well known and understood in the art, an imaginary axis extending through a cylindrical inductor's ferromagnetic core wrapped by its coil defines an inductor's longitudinal axis or axial core that is referenced in each inductor by a central "dot" 12A, 14A, 16A, 18A and 20A in FIG. 1, and by a dashed line 12A, 14A, 16A, 18A, and 20A in FIGS. 2 and 3.

In accordance with the present invention, all five inductors are positioned such that their axial cores are parallel to one another. Inductors 12, 14, 16, and 18 are positioned such that their axial cores lie at the vertices of a parallelogram. Inductors 12 and 16 lie at the ends of one diagonal (referenced by dashed line 30 in FIG. 1) of the parallelogram, while inductors 14 and 18 lie at the ends of the other diagonal (referenced by dashed line 32) of the parallelogram. As will be explained later herein, signal processing is simplified when the parallelogram is a square. However, it is to be understood that the drive inductors could also be positioned at the vertices of other parallelograms (e.g., rectangle, rhombus, etc.) without departing from the scope of the present invention.

Each of the five inductors 12, 14, 16, 18, and 20 is a mechanically independent inductor structure so that no magnetic material is shared by the inductors. That is to say, any inductive coupling of magnetic fields associated with each of the inductors occurs only through the medium (e.g., air) in which all of the inductors are immersed. This greatly simplifies construction of position sensor 10 since conventional off-the-shelf inductors can be used.

In the illustrated embodiment, drive inductors 12, 14, 16, and 18 are mechanically fixed in their square arrangement by, for example, a support 40 (FIG. 3) that can be a specially designed support or can be part of an object (not shown) whose position is to be sensed by sensor 10. Sensing inductor 20 is positioned within the square arrangement defined by inductors 12, 14, 16, and 18. Sensing inductor 20 can be mechanically coupled to a support 42 that can be a specially designed support or can be part of an object (not shown) whose position is to be sensed by sensor 10. Supports 40 and 42 are configured for relative two-dimensional or translational movement such that sensing inductor 20 experiences relative two-dimensional/translational movement with respect to the square arrangement of inductors 12, 14, 16, and 18. Accordingly, support 40 could be stationary and support 42 could be configured for two-dimensional/translational movement of sensing inductor 20 in the square defined by inductors 12, 14, 16, and 18 as indicated by intersecting two-headed arrows 50. Alternatively, support 42 could be stationary and support 40 could be configured for two-dimensional/translational movement about sensing inductor 20.

The above-described mechanical aspects of inductive position sensor 10 are incorporated with electrical features to provide position sensing capability. One such electrical connection scenario will be described with the aid of FIG. 2. For clarity of illustration, the above-described mechanical aspects are not illustrated in FIG. 2. However, it is to be understood that these mechanical aspects would typically be included along with the electrical connection scenario depicted in FIG. 2.

In FIG. 2, two current sources 60 and 62 are used to supply to two electric currents of different frequencies. It is to be understood that current sources 60 and 62 could be embodied in completely different devices or in a single device (e.g., function generator with independently controlled frequency outputs) without departing from the scope of the present invention. Current source 60 generates or supplies oscillating current at frequency $f_1$, while current source 62 generates or supplies an oscillating current at frequency $f_2$. Current source 60 is electrically coupled to drive inductors 12 and 16, while current source 62 is electrically coupled to drive inductors 14 and 18.

In the illustrated embodiment, the electric current at first frequency $f_1$ is supplied to drive inductors 12 and 16 in a serial fashion such that inductor 12 receives current that is of opposite polarity to that supplied to inductor 16. In a similar fashion, the electric current at second frequency $f_2$ is supplied to drive inductors 14 and 18 in a serial fashion such that inductor 14 receives current that is of opposite polarity to that supplied to inductor 18. The oscillating currents supplied to drive inductors 12, 14, 16, and 18 can have the same magnitude although this is not a requirement of the present invention. Since the currents are at different frequencies, the phase relationship between the two currents is not important. As a result of driving inductors 12, 14, 16, and 18 in this fashion, magnetic fields of frequency $f_1$ are produced by inductors 12 and 16, while magnetic fields of frequency $f_2$ are produced by inductors 14 and 18. The magnetic fields are zero where diagonals 30 and 32 intersect and are non-zero elsewhere in the square defined by drive inductors 12, 14, 16, and 18. Accordingly, zero voltage will be induced in sensing inductor 20 when it is positioned at the intersection of diagonals 30 and 32, while at least one non-zero voltage will be induced in sensing inductor 20 when it is positioned elsewhere in the square defined by drive inductors 12, 14, 16, and 18. More specifically, a non-zero voltage at frequency $f_1$ will be generated when sensing inductor 20 is not on diagonal 30, and a non-zero at frequency $f_2$ will be generated when sensing inductor 20 is not on diagonal 32. Thus, non-zero voltages at frequencies $f_1$ and $f_2$ will be generated when sensing inductor 20 is not on either diagonal 30 or diagonal 32. The magnitudes and polarities of the voltage components are indicative of the position of inductor 20 relative to inductors 12, 14, 16, and 18.

In the FIG. 2 embodiment, sensing inductor 20 is coupled to a processor 64 capable of measuring and discriminating the above-described two voltage components induced in inductor 20. It is to be understood that the term "processor" as used herein is inclusive of digital and/or analog signal conditioning circuitry to include amplifiers, filters, etc., that facilitate the capture and separation of the two voltage components as would be understood in the art. The induced voltages and their polarities are indicative of the relative position of sensing inductor 20 as compared to inductors 12, 14, 16, and 18. Tests of the present invention have yielded the unexpected result that the multiple-frequency voltages induced in sensing inductor 20 are highly linear as the air (or other media of immersion) gaps between sensing inductor 20 and the drive inductors change along diagonals 30 and 32. When sensing inductor 20 moves off of diagonals 30 and 32, the relationship between voltage and position becomes more complicated as will discussed further below. The various voltage-to-position relationships will be true regardless of whether sensing inductor 20 moves relative to the drive inductors, or the fixed-relationship combination of the drive inductors moves relative to sensing inductor 20.

The above-described two frequencies $f_1$ and $f_2$ must be chosen such that the motion/position of sensing inductor 20 correlated to the voltage at frequency $f_1$ does not affect the voltage at frequency $f_2$, and vice-versa. Whether this happens or not is dependent on (i) the signal-to-noise ratio for each frequency measurement, and (ii) the time constant of the measurement. Thus, if the signals are measured to great precision, the two drive frequencies will need to be separated more than for a low precision measurement. Also, if the sensing inductor is moving rapidly, then the processor will not be able to average the signals over a long period and will, therefore, need to operate over a larger frequency range in order to track the motion of the sensing inductor.

Converting the above-described two voltage components to position information can be handled by processor 64 in a variety of ways without departing from the scope of the present invention. For example, sensing system 10 could be calibrated before use whereby drive inductors 12, 14, 16, and 18 were operated for a variety of predefined positions of sensing inductor 20. The induced voltage component values for each predefined position could be measured and stored along with the corresponding predefined position in a look-up table maintained by processor 64. During use of system 10, the actual measured voltage components would be used by processor 64 to find the closest match to the predefined positions stored in the processor's look-up table with the corresponding stored position thereby approximating the actual position of the sensing inductor. Processor 64 could also be programmed to select the two closest predefined positions and use them in interpolation functions/methods to more closely approximate the actual position of the sensing inductor.

In another processing embodiment of the present invention, an analytic approach can be programmed into processor 64 to directly convert the two measured voltage components to an approximate position of sensing inductor 20. By way of example, one such analytic approach will be described herein where it will be assumed that all four drive inductors have the same inductance value and that the axial cores associated with all four drive inductors are parallel to one another and are on the corners of a square. The described approach also assumes that the sensing inductor will only undergo two-dimensional translation within a region whose extent is small compared to the spacing between adjacent ones of the drive inductors. Making the above assumptions, sensing inductor 20 can develop voltages from the two drive inductors 12 and 16 operating at frequency $f_1$ that vary as $a_0+a_1d_1$ and $-(a_0+a_1d_2)$ where $d_1$ is the distance from inductor 20 to inductor 12 and $d_2$ is the distance from inductor 20 to inductor 16. Subtracting these yields $V_1=a_1(d_1-d_2)$ thereby showing that the voltage is a function of the difference in distance to the two drive inductors. An equivalent expression for the two drive inductors 14 and 18 is $V_2=b_1(d_3-d_4)$. Geometrically, this means that if inductor 20 were to translate in two dimensions along a hyperbolic arc "centered" about one of these drive inductors, then the corresponding voltage, $V_1$ or $V_2$ would be a constant. The hyperbolic constant voltage stems from the well-known fact that a hyperbola is the shape generated when the difference in the distance to two foci (i.e., two diagonally opposed inductors in this case) is held constant.

Given a pair of voltages (i.e., one for each of the two drive frequencies), the x and y locations of inductor 20 can be determined using the following expressions for hyperbolas $$1 = \frac{x^2}{(V_1/(2a_1))^2} - \frac{y^2}{(L^2 - (V_1/(2a_1))^2)}$$

$$1 = \frac{y^2}{(V_2/(2b_1))^2} - \frac{x^2}{(L^2 - (V_2/(2b_1))^2)}$$

where L represents twice the distance between diagonally-opposed drive inductors (i.e., length of diagonals 30 and 32), and $a_1$ and $b_1$ are the proportionality constants between position and voltage for the two drive frequencies, respectively. While the above equations can be solved explicitly for "x" and "y", the solutions are complicated. Simpler results can be found by performing a Taylor Series expansion of the above expressions where it is assumed that the translation range of inductor 20 is much smaller than the spacing between the drive inductors. Doing this yields expressions for the x and y positions of inductor 20 of the form $$x = \frac{V_1}{2a_1} + \frac{V_1 V_2^2}{16 a_1 b_1^2 L^2} = \frac{V_1}{2a_1}\left(1 + \frac{V_2^2}{8 b_1^2 L^2}\right).$$

$$y = \frac{V_2}{2b_1} + \frac{V_2 V_1^2}{16 b_1 a_1^2 L^2} = \frac{V_2}{2b_1}\left(1 + \frac{V_1^2}{8 a_1^2 L^2}\right).$$

Processor 64 would then incorporate these functions into its programming for x and y position determination.

The cylindrical inductors used in embodiments of the present invention can be of any conventional design, e.g., standard cylindrical, dumb-bell shaped, etc. Their physical size and inductance can be selected to satisfy the requirements of a particular application. In general, the frequencies of the supplied oscillating currents should be large enough such that the impedance of the current-driven inductors is large compared to their total resistance. Further, for best sensitivity, sensing inductor 20 should be a (magnetically) unshielded inductor. Of course, all five of the inductors in system 10 could be unshielded. Drive inductors 12, 14, 16, and 18 (or all five inductors) can be, but need not be, identical in terms of their inductance value (to within normal/acceptable tolerances) in order to simplify drive and/or measurement electronics. However, it is to be understood that the present invention could be practiced using drive inductors having different inductance values, although this may require adjustments in one or more of the drive currents, inductor core materials, etc., to make the ultimate position sensing system perform as needed.

As mentioned above, the four drive inductors can be arranged at the vertices of other parallelograms without departing from the scope of the present invention. Still further, other geometric arrangements of drive inductors could be employed if more drive inductors were to be used. For example, six drive inductors could be arranged at the vertices of a hexagon with each pair of diagonally-opposed inductors being driven at a unique frequency such that three different drive frequencies would be utilized.

A variety of other electrical connection scenarios could also be used without departing from the scope of the present invention. For example, since the drive and measurement signals are oscillatory, a synchronous detection system (e.g., one using a lock-in amplifier) can be used when monitoring the output voltage of the sensing inductor. That is, the drive signal from the source can also be supplied to a lock-in amplifier-based voltage measurement device. As is known in the art, the lock-in amplifier uses the drive signal as a reference in order to synchronize the voltage measurement. This will improve the signal-to-noise ratio of the position sensor as would be understood by one of ordinary skill in the art. Such lock-in amplifiers can be incorporated as part of the above-described processor 64.

The advantages of the present invention are numerous. The position sensor and its drive/measurement electronics are simple to design and construct using conventional off-the-shelf components. The sensor's linear operating range further simplifies processing requirements and guarantees high resolution. The system's use of simple inductors will allow it to adapt to a variety of small-scale and large-scale applications.

Although the present invention has been disclosed in terms of a number of embodiments, it will be understood that numerous modifications and variations could be made thereto without departing from the scope of the invention as defined by the following claims.

We claim:

1. An inductive position sensing system, comprising:
   four drive inductors, each of said drive inductors having an axial core, said drive inductors arranged at vertices of a parallelogram wherein said axial core for each corresponding one of said drive inductors is located at one of said vertices;
   a sensing inductor having an axial core, said sensing inductor positioned within said parallelogram wherein said axial core of said sensing inductor is parallel to each said axial core of said drive inductors;
   each of said drive inductors and said sensing inductor being a mechanically independent inductor structure;
   said drive inductors and said sensing inductor immersed in a common medium wherein said drive inductors and said sensing inductor are inductively coupled through said common medium;
   said sensing inductor being movable within said parallelogram and relative to said drive inductors wherein said axial core of said sensing inductor remains parallel to each said axial core of said drive inductors;
   sources for supplying a first oscillating current at a first frequency to a first pair of said drive inductors located at ends of a first diagonal of said parallelogram, and for supplying a second oscillating current at a second frequency to a second pair of said drive inductors located at ends of a second diagonal of said parallelogram, wherein said sensing inductor generates a first output voltage at said first frequency and a second output voltage at said second frequency; and
   a processor coupled to said sensing inductor for determining a position of said sensing inductor relative to said drive inductors using said first output voltage and said second output voltage.

2. An inductive position sensing system as in claim 1, wherein said sensing inductor comprises an unshielded inductor.

3. An inductive position sensing system as in claim 1, wherein each of said drive inductors and said sensing inductor comprise an unshielded inductor.

4. An inductive position sensing system as in claim 1, wherein each of said drive inductors and said sensing inductor has the same inductance value.

5. An inductive position sensing system as in claim 1, wherein said processor stores a plurality of predefined positions of said sensing inductor with each of said predefined positions having corresponding values of said first output voltage and said second output voltage associated therewith, and wherein said processor selects one of said predefined positions as said position of said sensing inductor based on said first output voltage and said second output voltage.

6. An inductive position sensing system as in claim 1, wherein said processor stores a plurality of predefined positions of said sensing inductor with each of said predefined positions having corresponding values of said first output voltage and said second output voltage associated therewith, and wherein said processor is programmed to interpolate between two of said predefined positions to approximate said position of said sensing inductor based on said first output voltage and said second output voltage.

7. An inductive position sensing system as in claim 1, wherein said processor is programmed with a function that generates said position using said first output voltage and said second output voltage as input parameters for said function.

8. An inductive position sensing system, comprising:
   four drive inductors, each of said drive inductors having an axial core, said drive inductors fixed at vertices of a square wherein said axial core for each corresponding one of said drive inductors is located at one of said vertices;
   a sensing inductor having an axial core, said sensing inductor positioned within said square wherein said axial core of said sensing inductor is parallel to each said axial core of said drive inductors;
   each of said drive inductors and said sensing inductor being a mechanically independent inductor structure and having the same inductance value;
   said drive inductors and said sensing inductor immersed in a common medium wherein said drive inductors and said sensing inductor are inductively coupled through said common medium;
   said sensing inductor being movable within said square and relative to said drive inductors wherein said axial core of said sensing inductor remains parallel to each said axial core of said drive inductors;
   sources for supplying a first oscillating current at a first frequency to a first pair of said drive inductors located at ends of a first diagonal of said square, and for supplying a second oscillating current at a second frequency to a second pair of said drive inductors located at ends of a second diagonal of said square, wherein said sensing inductor generates a first output voltage at said first frequency and a second output voltage at said second frequency; and
   a processor coupled to said sensing inductor for determining a position of said sensing inductor relative to said drive inductors using said first output voltage and said second output voltage.

9. An inductive position sensing system as in claim 8, wherein said sensing inductor comprises an unshielded inductor.

10. An inductive position sensing system as in claim 8, wherein each of said drive inductors and said sensing inductor comprise an unshielded inductor.

11. An inductive position sensing system as in claim 8, wherein said processor stores a plurality of predefined positions of said sensing inductor with each of said predefined positions having corresponding values of said first output voltage and said second output voltage associated therewith, and wherein said processor selects one of said predefined positions as said position of said sensing inductor based on said first output voltage and said second output voltage.

12. An inductive position sensing system as in claim 8, wherein said processor stores a plurality of predefined positions of said sensing inductor with each of said predefined positions having corresponding values of said first output voltage and said second output voltage associated therewith, and wherein said processor is programmed to interpolate between two of said predefined positions to approximate said position of said sensing inductor based on said first output voltage and said second output voltage.

13. An inductive position sensing system as in claim 8, wherein said processor is programmed with a function that generates said position using said first output voltage and said second output voltage as input parameters for said function.

14. An inductive position sensing system, comprising:
   a support;
   four drive inductors, each of said drive inductors having an axial core, said drive inductors fixed to said support at vertices of a parallelogram wherein said axial core for each corresponding one of said drive inductors is located at one of said vertices;
   a sensing inductor having an axial core, said sensing inductor adapted to be coupled to an object and positioned within said parallelogram wherein said axial core of said sensing inductor is parallel to each said axial core of said drive inductors, said sensing inductor translating in two dimensions along with the object and within said parallelogram wherein said axial core of said sensing inductor remains parallel to each said axial core of said drive inductors;

each of said drive inductors and said sensing inductor being a mechanically independent inductor structure;

said drive inductors and said sensing inductor immersed in a common medium wherein said drive inductors and said sensing inductor are inductively coupled through said common medium;

sources for supplying a first oscillating current at a first frequency to a first pair of said drive inductors located at ends of a first diagonal of said parallelogram, and for supplying a second oscillating current at a second frequency to a second pair of said drive inductors located at ends of a second diagonal of said parallelogram, wherein said sensing inductor generates a first output voltage at said first frequency and a second output voltage at said second frequency; and a processor coupled to said sensing inductor for determining a position of said sensing inductor relative to said drive inductors using said first output voltage and said second output voltage.

15. An inductive position sensing system as in claim 14, wherein said sensing inductor comprises an unshielded inductor.

16. An inductive position sensing system as in claim 14, wherein each of said drive inductors and said sensing inductor comprise an unshielded inductor.

17. An inductive position sensing system as in claim 14, wherein each of said drive inductors and said sensing inductor has the same inductance value.

18. An inductive position sensing system as in claim 14, wherein said processor stores a plurality of predefined positions of said sensing inductor with each of said predefined positions having corresponding values of said first output voltage and said second output voltage associated therewith, and wherein said processor selects one of said predefined positions as said position of said sensing inductor based on said first output voltage and said second output voltage.

19. An inductive position sensing system as in claim 14, wherein said processor stores a plurality of predefined positions of said sensing inductor with each of said predefined positions having corresponding values of said first output voltage and said second output voltage associated therewith, and wherein said processor is programmed to interpolate between two of said predefined positions to approximate said position of said sensing inductor based on said first output voltage and said second output voltage.

20. An inductive position sensing system as in claim 14, wherein said processor is programmed with a function that generates said position using said first output voltage and said second output voltage as input parameters for said function.

21. An inductive position sensing system as in claim 14, wherein said parallelogram comprises a square.

* * * * *